F. W. DRAPER.
REGULATOR FOR MECHANICAL PLAYERS FOR MUSICAL INSTRUMENTS.
APPLICATION FILED APR. 15, 1903.
915,420.
Patented Mar. 16, 1909.
2 SHEETS—SHEET 1.
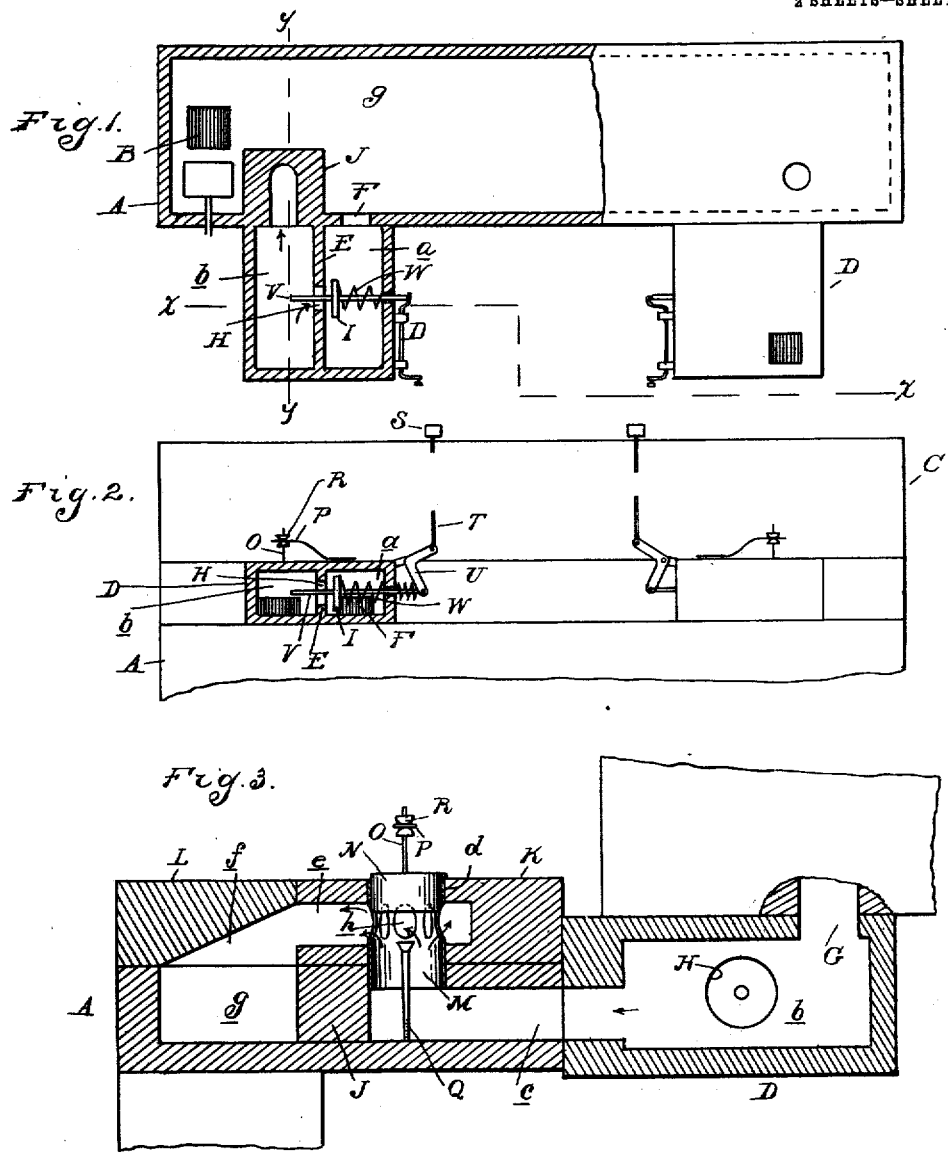
Witnesses
James P. Barry
H. C. Smith
Inventor
Francis W. Draper
By James Whittemore
atty.

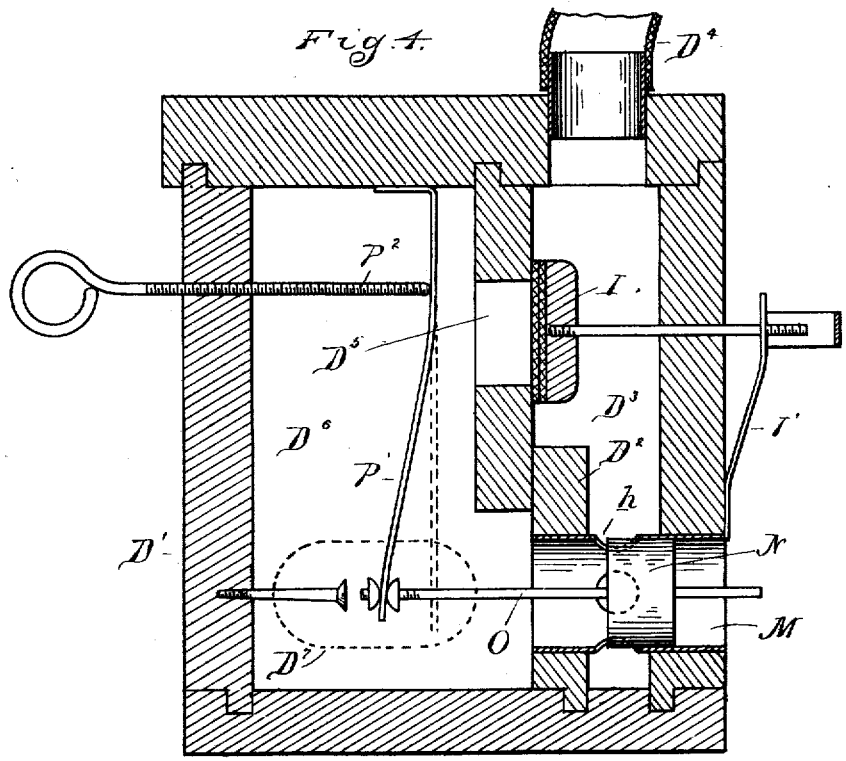

UNITED STATES PATENT OFFICE.

FRANCIS W. DRAPER, OF DETROIT, MICHIGAN, ASSIGNOR TO FARRAND ORGAN COMPANY, OF DETROIT, MICHIGAN, A CORPORATION OF MICHIGAN.

REGULATOR FOR MECHANICAL PLAYERS FOR MUSICAL INSTRUMENTS.

No. 915,420.  Specification of Letters Patent.  Patented March 16, 1909.

Application filed April 15, 1903. Serial No. 152,673.

*To all whom it may concern:*

Be it known that I, FRANCIS W. DRAPER, residing at Detroit, in the county of Wayne and State of Michigan, a citizen of the United States, have invented certain new and useful Improvements in Regulators for Mechanical Players for Musical Instruments, of which the following is a specification, reference being had therein to the accompanying drawings.

The invention relates to mechanical players for musical instruments, and has particular reference to the means employed for regulating the flow of air.

Heretofore instruments of this character have been provided with regulators for governing the pressure of air on different portions of the action. Thus, the wind supplied to the motor for driving the music sheet is usually governed by a regulator, and in some construction of players the wind for operating the key actuating pneumatics is also governed by a regulator intermediate the store bellows and action. The regulators heretofore employed have however been in the form of small bellows provided with a spring of different tension from that of the main or store bellows so as to operate under a different pressure of air, said small bellows controlling a valve for restricting the flow of air.

It is the object of the present invention to obtain a simple construction of regulator which is exceedingly sensitive in its action.

It is a further object to dispense with the usual regulating bellows and to effect the regulation solely by the use of the valve.

With these objects in view the invention consists in the construction hereinafter set forth.

In the drawings Figure 1 is a sectional plan showing a portion of the wind connections in a mechanical player, together with the regulator. Fig. 2 is a vertical section substantially on line $x\,x$ Fig. 1. Fig. 3 is an enlarged cross section on line $y\,y$ Fig. 1. Fig. 4 is a section through a modified construction.

A is a wind box connected through the port B with the bellows (not shown).

C is the casing containing the pneumatic action which is connected to the box A through the laterally extending boxes D. These boxes are divided by partitions E into two compartments $a$ and $b$, one of which communicates through port F directly with the box A, while the other is connected through the port G with the action. The two members are adapted to communicate with each other through a port H in the partition E which is closed or opened by a valve I.

The parts thus far described are not essential to the present invention, but constitute one arrangement of wind connections with which my improved regulator may be used. The drawings also show two of the boxes D for connecting the wind chest A with the action at the opposite ends of the latter, this arrangement being designed for use in connection with a divided action (not shown). Where the whole of the action operates under the same air pressure, one only of the connections D is necessary.

The regulator is placed in connection between the chamber $b$ and the box A, and consists essentially of an automatic valve adapted to restrict the passage so as to produce a lighter operation of the action by the wind passing therethrough. At the same time it is so constructed as to always supply sufficient air to operate the action regardless of the number of pneumatics that are simultaneously in use.

As shown, J is a block arranged in the chest A, and having formed therein a passage $c$ connecting with the chamber $b$. K is the board or strip forming a portion of the top wall of the chest A and fitting against the block J. Through this strip is bored a channel $d$ connecting with the channel $c$. $e$ is the channel extending laterally in the strip K and intersecting with the bore $d$. The channel $e$ is connected by the channel $f$ in the complementary cover strips L with the chamber $g$ within the chest A.

The bore $d$ is preferably lined with a bushing M which has formed therein an annular series of ports $h$ connecting with the lateral extending channel $e$. N is a piston slidingly engaging the bushing M and adapted in one position to cover the ports $h$ and cut off communication between the channels $d$ and $e$. The piston N is provided with a stem O projecting outwardly, and this stem engages a spring P adapted to normally hold the piston in a position where the ports $h$ are uncovered.

The tension of the spring P is such as to yield to the external pressure upon the piston N when the normal vacuum is produced in the chamber $g$. Thus, the piston will be moved inward so as to close or partially close the ports $h$. Q is a stop which arrests further inward movement of the piston after the valve is closed. As shown, this stop is in the form of a screw arranged within the channel $d$ and engaging with the bottom of the chest. The stem O is preferably threaded for the engagement of the washer R by means of which the spring is attached to the stem, and which may be adjusted by altering the tension of said spring.

The valve I is adapted to be operated by a suitable connection under the control of the player. As shown, this comprises the button S connected by the rod T and bell crank lever U with the stem V of the valve. A spring W is provided for normally opening the valve which is closed by pressure on the button S.

In operation a vacuum is provided in the chamber $g$ by the operation of the pumping mechanism. This chamber is normally connected with the action through two distinct connections, one by way of the port F, chamber $a$, port H, chamber $b$, and port G; and the other through the passages $f$, $e$, $d$, and $c$ to the chamber $b$, and through the port G to the action. As soon however as the vacuum is developed within the chamber $g$, external atmospheric pressure operating upon the piston N will cause the inward movement of said piston. This will so restrict the ports $h$ as to permit only a small quantity of air to pass therethrough, or it may momentarily close the ports.

In the use of the instrument with the parts in the position shown in Figs. 1 and 2, an unobstructed communication is established through the first of the passages above described so that the action operates under full air pressure. If it is desired to soften the action, by pressing upon the button S the valve I may be wholly or partially closed which will compel the air to pass to a greater or less extent by way of the restricted passage. This will diminish the operating air pressure upon the pneumatics of the action, and will produce a softened effect.

Should a large number of pneumatics be suddenly thrown into action, a larger volume of air would be required for their operation which would pass from the action and through the chamber $b$ and passage $c$ into the passage $d$. This would diminish the air pressure operating upon the piston N with the result that the spring P would instantaneously operate to retract the piston and enlarge the ports $h$. This removal of the restriction will cause an equalization of pressure between the chamber $g$ and $b$, which will again overbalance the spring P and move the piston inward to again restrict the ports. It will be obvious from this description that the piston N will operate automatically to vary the restriction of the ports so as to maintain a constant operating pressure on the pneumatics for each position of adjustment of the valve I. The pressure is however varied by a change of adjustment of valve I so as to admit a larger or smaller volume of air by way of the port $h$.

In Fig. 4 a modification is shown in which the regulator and controlling devices are arranged in a box D', which is preferably arranged directly below the action. In this construction the valve N slides in a tube M extending through the outer wall of the box D' and into a partition $D^2$. The ports $h$ in the tube M are arranged between the partition $D^2$ and the outer wall and connects with the chamber $D^3$, which chamber is connected through the conduit $D^4$ with the store bellows. The partition $D^2$ has the port $D^5$ formed therein which is controlled by the valve I, the stem of said valve passing out through the casing and being connected with a spring I' for normally retracting the valve from its seat. The piston N is connected with the stem O which in turn is connected with a spring P' arranged within a chamber $D^6$ on the opposite side of the partition $D^2$. $P^2$ is a screw against the spring P' and adapted to adjust the tension of said spring. Dotted lines $D^7$ indicate the point of connection between the chamber $D^6$ and the action.

In operation the valve N will variably restrict the ports $h$ so as to maintain substantially uniform pressure in the chamber $D^6$. The pressure of the air in the chamber $D^3$ acting upon the valve N renders the same free to move in the tube M, being actuated by the differential pressure acting thereon. The valve I is for manual operation the same as valve I of the other figures.

What I claim as my invention is:

1. In a pneumatic player for musical instruments, an air pressure regulator comprising an air conduit having a cylinder therein opening at one end to the atmosphere, and at the other end communicating with a portion of said conduit, said cylinder being provided with an annular series of ports communicating with another portion of the conduit exterior to said cylinder, a piston valve freely movable within said cylinder and adapted to be actuated by air pressure thereon to close said ports and a counter tension for moving said valves to open said ports.

2. In a mechanical player for musical instruments, the combination with chambers respectively for regulated and unregulated air pressures, and a connecting passage between said chambers, of a piston valve for variably restricting said passage arranged to be actuated by varying air pressure, the pressure operating upon one end of said valve being that of the regulated air.

3. In a pneumatic player for musical instruments, the combination with adjacent chambers respectively for regulated and unregulated air pressures, of a cylinder passing through the chamber for the unregulated pressure, being ported to communicate therewith, and communicating at one end with said chamber for the regulated pressure, a piston valve slidable within said cylinder, having one end exposed to the regulated air pressure and the opposite end to a different air pressure, and means for yieldably pressing said piston to open said port.

4. A regulator for pneumatically operated musical instruments comprising two chambers, and a connecting port therebetween, a valve movable to close or open said port having one face thereof exposed to the pressure in one of said chambers, and the pressure upon the other face which operates on said valve, being constant and serving to position the valve in a balanced position, and tension means operating constantly directly on said valve in opposition to the pressure in the first mentioned chamber, whereby variations of pressure in said chamber produce a shifting of the valve.

5. A regulator for pneumatically operated musical instruments, a valve for varying the extent of the opening between two chambers, having one face thereof exposed directly to the pressure in one of said chambers, and having an opposed face subjected to a constant and unvariable pneumatic pressure and an additional tension device operating upon said valve in opposition to the said chamber pressure whereby it is instantly shifted in position to enlarge or contract the opening between said chambers by a variation of the pressure in the said chamber to which it is exposed.

In testimony whereof I affix my signature in presence of two witnesses.

FRANCIS W. DRAPER.

Witnesses:
   Jas. P. Barry,
   Rose Leova Morgan.